Nov. 4, 1958
L. W. MARKS
2,859,056
CLAMPING DEVICE
Filed April 9, 1956
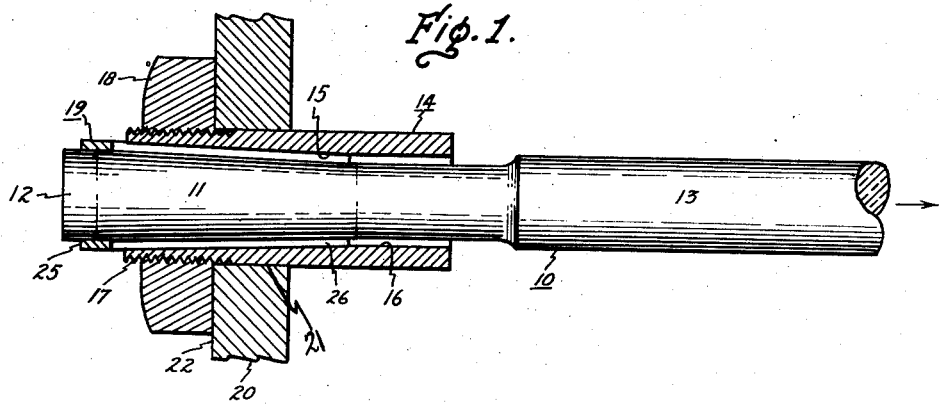
Fig. 1.
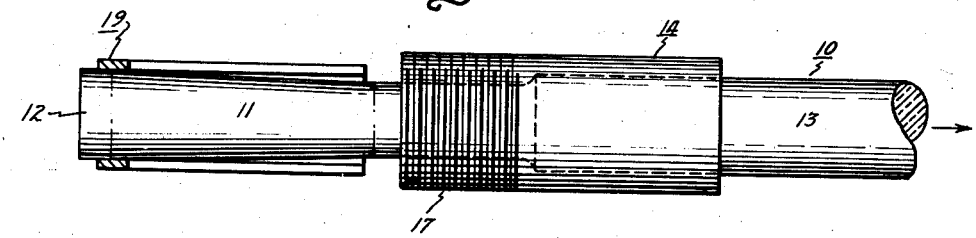
Fig. 3.
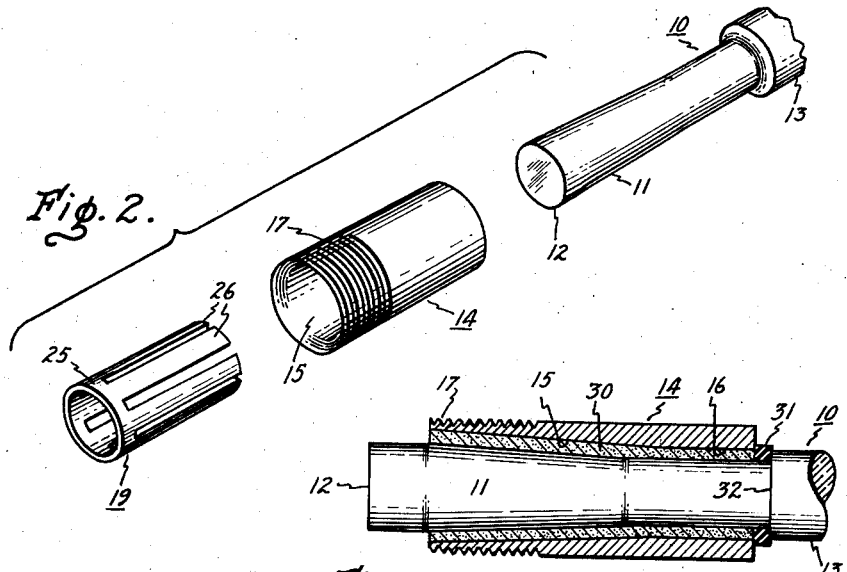
Fig. 2.
Fig. 4.
Inventor
Louis W. Marks,
by Gilbert P. Tarleton
His Attorney.

United States Patent Office 2,859,056
Patented Nov. 4, 1958

2,859,056

CLAMPING DEVICE

Louis W. Marks, Pittsfield, Mass., assignor to General Electric Company, a corporation of New York Application April 9, 1956, Serial No. 577,067

1 Claim. (Cl. 287—20.3)

This invention relates to clamping means for generally rod-shaped members, and more in particular to improved clamping means for holding rod-shaped members of a material such as fiber glass reinforced plastic or the like.

Resin bonded fiber glass rods, while having excellent insulating characteristics and high tensile strength, have not been employed to a great extent in the past due to difficulties in providing clamping means that have sufficient strength and do not damage the rods. The provision of a practical clamping means would permit the use of this desirable material in such applications as for insulation supports in electrical apparatus and also as a reinforcing material for prestressed concrete beams. It has been found that such conventional clamping means as molded heads, inserts, and cut, ground, or molded threads do not provide a satisfactory clamping means for fiber glass rods, either due to lack of sufficient strength or difficulty of formation.

It is therefore an object of this invention to provide an improved clamp means for rod-shaped members.

A further object of this invention is to provide clamping means for holding rod-shaped members of materials such as fiber glass or the like which may be damaged by conventional clamping means.

A still further object of this invention is to provide clamping means for holding rod-shaped members of a material such as fiber glass or the like, the clamping means being adapted to hold the member in tension without damaging it.

Briefly stated, in accordance with one aspect of my invention, I provide means for holding rod-shaped members of such materials as fiber glass or the like. I provide an externally tapered portion on the rod-shaped member, and surrounding this tapered portion is a first sleeve means having an internal taper of the same angle as the tapered portion of the rod member. The tapered portions of the rod member and the sleeve are separated by a second sleeve means having a hollow frustoconical shape. The second sleeve means is held in compression between the rod-shaped member and the first sleeve means, and the first sleeve means may be threaded or otherwise adapted for being rigidly held.

While the specification concludes with claims particularly pointing out and distinctly claiming the subject matter which I regard as my invention, it is believed that the invention will be better understood from the following description taken in connection with the accompanying drawing in which:

Fig. 1 is a partially cross-sectional view illustrating one embodiment of a clamping means according to my invention, Fig. 2 is an exploded perspective view of parts of the clamp of Fig. 1, Fig. 3 is a partly disassembled view of the clamping means of Fig. 1, and Fig. 4 is a partially cross-sectional view of a modification of the clamping means of Fig. 1.

Referring now to the drawing, and more in particular to Fig. 1, therein is illustrated a rod-shaped member 10. For the purpose of this disclosure, it is assumed that a force is acting on the rod, as indicated by the arrow, that is tending to pull the rod axially toward the right-hand margin of the illustration. In order to restrain this force, I provide a tapered portion 11 at or near the end 12 of the rod. The taper 11 extends radially inward from the end 12. The tapered portion 11 is preferably machined or ground on the rod 10, in which case the end 12 of the rod 10 and the unmachined portion 13 of the rod will have the same diameter.

A sleeve member 14 is provided surrounding at least a portion of the tapered portion 11 of the rod 10, and at least a portion of the sleeve 14 has an internal taper 15 of substantially the same angle as the taper of the tapered portion 11 of rod 10. The taper of the sleeve 14 extends radially inward from the end 12 of rod 10. The sleeve 14 may have an extension 16 extending beyond the tapered portion 15 away from the end 12 of rod 10. In order to permit assembly of the clamping means if the sleeve 14 is not split, the internal diameter of the portion 16 of the sleeve 14 should have a diameter greater than the diameter of the end 12 of the rod 10.

The sleeve 14 may be provided with external threads 17 extending over a portion or all of its length, upon which may be threaded a nut 18.

Another sleeve member 19 is provided at least between the tapered portions of the rod 10 and the sleeve 14, at least a portion of the sleeve 19 assuming a frustoconical hollow shape with its inside surface contacting the tapered portion 11 of the rod 10 and its external portion contacting the taper 15 of sleeve member 14.

From the drawing of Fig. 1, it may be seen that the force in the right-hand direction acting on the rod 10 is transmitted to the nut 18, the sleeve 19 being held in compression between the tapered portions of the rod 10 and the sleeve 14 to prevent relative movement between the rod 10 and the sleeve 14. Movement of the assembly is prevented by a rigid member 20 having an aperture 21 through which the sleeve 14 extends, the nut 18 bearing against one face 22 of the rigid member 20.

Referring now to the exploded view of Fig. 2, the sleeve means 19 is illustrated as a collar 25 having a plurality of fingers 26 extending from one end. The collar 19 is preferably made from a deformable material such as copper or the like, and may be fabricated by providing a plurality of longitudinal splits in one end of a section of copper tubing.

In the preferred method of assembly of the clamp, the sleeve member 14 is first placed over the end 12 of the rod 10 and slipped beyond the tapered portion 11, as illustrated in Fig. 3. Then the sleeve member 19 is placed over the end 12 of the rod 10 so that the fingers 26 surround the tapered portions 11 of rod 10. The sleeve member 19 may be coated with an adhesive prior to assembly. Next the sleeve 14 is forced back over the sleeve 19 by a force somewhat below the force required to produce failure in compression in the rod 10, the sleeve member 14 thereby assuming the position illustrated in Fig. 1 with the finger portion of the sleeve member 19 assuming a substantially hollow frustoconical shape. In the use of my clamping device on fiber glass reinforced plastic rods it has been found that the coating of the sleeve 19 with an adhesive eliminates any tendency of the parts to creep.

While the clamping means of my invention is particularly adapted for the holding of rod members of materials such as fiber glass or the like which are not readily held by conventional means, my invention may be advantageously employed for holding other materials without departing from the spirit or scope thereof. Although I have illustrated the clamping means as applied to solid rod-shaped members, it is obvious that my invention may also be employed to hold hollow articles.

While the sleeve member 19 is preferably of the form previously disclosed, it is obvious that other forms may be employed for the same function. Thus the sleeve 19 may be comprised of two sections of longitudinal split tubing and preformed to the hollow frustoconical shape. As another modification, the sleeve between the tapered portion 11 of rod member 10 and the sleeve 14 may be comprised of a poured material 30 such as cement as illustrated in Fig. 4. In this modification, gasket means 31 may be provided between the end of sleeve 14 and a shoulder 32 on the unmachined portion 13 of rod 10 in order to prevent escape of the cement and fluid condition during the pouring of the cement 30. In the modification of Fig. 4, means, such as a jig, must be provided in order to align the sleeve 14 with the rod 10 during the pouring and setting of the cement 30.

It will be understood, of course, that, while the forms of the invention herein shown and described constitute preferred embodiments of my invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claim to cover all such changes as fall within the true spirit and scope of the invention.

What I claim as new and desire to secure by Letters Patent of the United States is:

Means for holding a resin bonded fiber glass rod against axial movement toward one end thereof comprising a tapered end portion on the other end of said rod, the diameter of said rod being at least as great as the maximum diameter of said tapered portion, first sleeve means having an internal taper surrounding the tapered portion of said rod, said internal taper extending inwardly toward said one end of said rod, said tapers having substantially the same angle, second sleeve means having a hollow frustoconical shape, said second sleeve means being disposed between and contacting the tapers of said rod and first sleeve means, said second sleeve means comprising a metallic collar having a plurality of deformable fingers extending from one end thereof, and a threaded external portion on said first sleeve means to permit stationary mounting thereof, the minimum internal diameter of said first sleeve means being greater than the maximum diameter of said other end of said rod to permit said first sleeve means to be slipped over said other end.

References Cited in the file of this patent

UNITED STATES PATENTS

| | | |
|---|---|---|
| 258,698 | Bissell | May 30, 1882 |
| 801,707 | Becker et al. | Oct. 10, 1905 |
| 1,145,238 | Frick | July 6, 1915 |
| 1,863,021 | Matthes | June 14, 1932 |
| 2,544,712 | Miller | Mar. 13, 1951 |